United States Patent [19]
Crane et al.

[11] Patent Number: 5,621,256
[45] Date of Patent: Apr. 15, 1997

[54] HYSTERESIS IN A CIRCUIT FOR SENSING PRESENCE OF A PLUG

[75] Inventors: Burke J. Crane, Lombard, Ill.; Garth S. Jones; Kevin L. Nelson, both of Virginia Beach, Va.

[73] Assignee: Molex Incorporated, Lisle, Ill.

[21] Appl. No.: 49,885

[22] Filed: Apr. 20, 1993

[51] Int. Cl.⁶ .................................................. H01H 47/00
[52] U.S. Cl. ........................................................ 307/125
[58] Field of Search ............................ 361/115, 42, 45, 361/394, 49, 71, 59, 62; 307/125

[56] References Cited

U.S. PATENT DOCUMENTS

| | | | |
|---|---|---|---|
| 4,970,623 | 11/1990 | Pintar | 361/187 |
| 5,164,609 | 11/1992 | Poppe et al. | 307/147 |
| 5,418,679 | 5/1995 | Crane et al. | 361/71 |

*Primary Examiner*—Aditya Krishnan
*Attorney, Agent, or Firm*—Stephen Z. Weiss

[57] ABSTRACT

An automatic switched power receptacle includes an outlet receptacle adapted to receive a plug. A relay is connected between the power receptacle and a source of power to selectively power the receptacle. A plug presence sensor in proximity to the receptacle senses presence of a plug in the receptacle. The plug presence sensor comprises a light source and light sensor, the light source and light sensor being disposed on opposite sides of a path of movement of a plug being inserted in the receptacle. An automatic control circuit is connected between the relay and the plug presence sensor for selectively energizing the relay to power the receptacle incident to the sensor sensing presence of a plug.

14 Claims, 2 Drawing Sheets

5,621,256

HYSTERESIS IN A CIRCUIT FOR SENSING PRESENCE OF A PLUG

FIELD OF THE INVENTION

This invention relates to a control for an automatic power receptacle and, more particularly, to use of hysteresis in such a control.

BACKGROUND OF THE INVENTION

In providing electrical circuits to a facility, such as a home, one or more branch circuits are wired to distribute electrical power to load devices, such as outlet receptacles or light fixtures. Typically, the receptacle or fixture is hardwired directly to the branch circuit, with power to the device being turned on or off at the device itself. For example, a light fixture might include a pull cord for actuating a switch, while a small appliance might include a power switch.

With recent technological developments it is both possible and advantageous to provide automated control of load devices to provide, for example, remote or timed switching. One such system directs all communication functions into a system controller. This gives a home owner flexible communication and power control from anywhere in the home there is a control panel or switch, or even anywhere there is a telephone, such as the car or office. An intelligent outlet receptacle allows individual appliances to be separately and automatically controlled as necessary or desired. To do so, some means must be provided for controlling switching of power to an electrical outlet receptacle. A practical switching device must be inexpensive and reliable. A latching relay has been found to be readily adaptable to such an application. A latching relay is latched when connected to a positive polarity voltage source and unlatched when connected to a negative polarity voltage source.

Some applications require that electrical power be applied to an outlet receptacle only when in use. Particularly, the outlet receptacle is disconnected from the power source when no plug is present and disconnected to the power source when a plug is inserted in the receptacle. In combination with the above-described features, such a control circuit enables a particular outlet receptacle to be controlled both in response to presence or absence of a plug and demands of external user or automatic control functions.

An automatic control such as described requires that insertion of a plug be detected and an electronic signal be delivered to a control to indicate presence or absence of the plug. While inserting or removing the plug, it is possible that the sensing system could cycle, resulting in relay "chatter". Obviously, it is desirable to prevent relay chatter.

The present invention is directed to solving one or more of the problems discussed above in a novel and simple manner.

SUMMARY OF THE INVENTION

In accordance with the invention there is provided an automatic power receptacle including a hysteresis control.

Broadly, there is disclosed herein an automatically switched power receptacle including an outlet receptacle adapted to receive a plug. A relay is connected between the outlet receptacle and a source of power to selectively power the receptacle. A plug presence sensor in proximity to the receptacle senses presence of a plug in the receptacle. An automatic control circuit is connected between the relay and the plug presence sensor for selectively energizing said relay to power the receptacle incident to the sensor sensing presence of a plug, the control circuit including a hysteresis circuit to prevent cycling of the relay.

It is a feature of the invention that the relay comprises a latching relay.

It is another feature of the invention that the plug presence sensor comprises a light source and a light sensor, the light source and light sensor being disposed on opposite sides of a path of movement of a plug being inserted in the receptacle.

It is a further feature of the invention that the hysteresis circuit comprises means for dimming the light source when the relay is energized.

It is a further feature of the invention that the light source comprises an LED and the light sensor comprises a photo-sensitive switching device.

In accordance with another aspect of the invention there is disclosed an automatic switched power receptacle including an outlet receptacle adapted to receive a plug. A relay is connected between the power receptacle and a source of power to selectively power the receptacle. A plug presence sensor in proximity to the receptacle senses presence of a plug in the receptacle. The plug presence sensor comprises a light source and light sensor, the light source and light sensor being disposed on opposite sides of a path of movement of a plug being inserted in the receptacle. An automatic control circuit is connected between the relay and the plug presence sensor for selectively energizing the relay to power the receptacle incident to the sensor sensing presence of a plug.

In accordance with another aspect of the invention, there is disclosed an automatically switched power receptacle including an outlet receptacle adapted to receive a plug. A relay is connected between the outlet receptacle and a source of power to selectively power the receptacle. A plug presence sensor in proximity to the receptacle senses presence of a plug in the receptacle. The plug presence sensor comprises a light source and a light sensor. The light source and light sensor are disposed on opposite sides of a path of movement of a plug being inserted in the receptacle. The light sensor assumes a first or second state incident to the sensed light being above or below a select level. An automatic control circuit is connected between the relay and the plug presence sensor for selectively energizing the relay to power the receptacle incident to the light sensor being in the second state. The control circuit includes means for determining if the relay is energized and controlling the light source to dim the light source if the relay is energized.

It is a feature of the invention that the determining means dims the light source incident to the light sensor being in the second state.

Particularly, the plug presence sensor comprises an LED and light sensor in the form of a photo-transistor which senses presence of a plug in a receptacle. The sensor is monitored by a microprocessor to control latching of a relay. The relay is de-energized, so that no power is present at the receptacle, when no plug is inserted. When the plug is inserted, then the relay is energized to provide power. To avoid chattering of the relay, an input to the microcontroller indicates the status of the light sensor, i.e., the presence or absence of the plug. The prong of the plug, when present, cuts off light from the LED. Hysteresis is provided by enhancing the feedback signal. Particularly, as a plug is inserted, the amount of sensed light gradually decreases. At the point at which the light has decreased sufficiently to indicate the presence of a plug, the relay is energized. This turns on a relay drive output which also is connected to the LED to dim the LED. Conversely, when the plug is removed, additional light is sensed until a point is reached at which the plug is considered to have been sufficiently removed to turn the relay off. At this time, the relay drive output is set low to brighten the output from the LED's so that the sensed light increases.

Further features and advantages of the invention will be readily apparent from the specification and from the drawing.

DETAILED DESCRIPTION OF THE INVENTION

Figure 1:
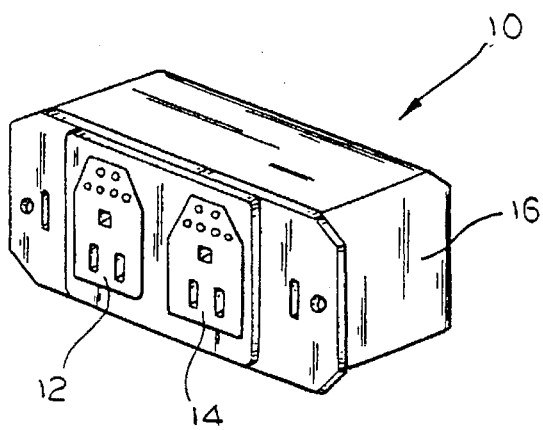
FIG. 1 is a perspective view of a switched power receptacle according to the invention.

FIG. 1 illustrates an automatically switched power receptacle 10 in accordance with the invention. The switched power receptacle 10 includes a first outlet receptacle 12 and a second outlet receptacle 14, each in a housing 16. Each outlet receptacle 12 and 14 is adapted to receive a conventional three-prong plug for selectively providing electrical power thereto. The illustrated power receptacles 12 and 14 includes additional receptacle structure for data communication which are not relevant to the claimed invention and therefore are not described in detail herein.

Figure 2:
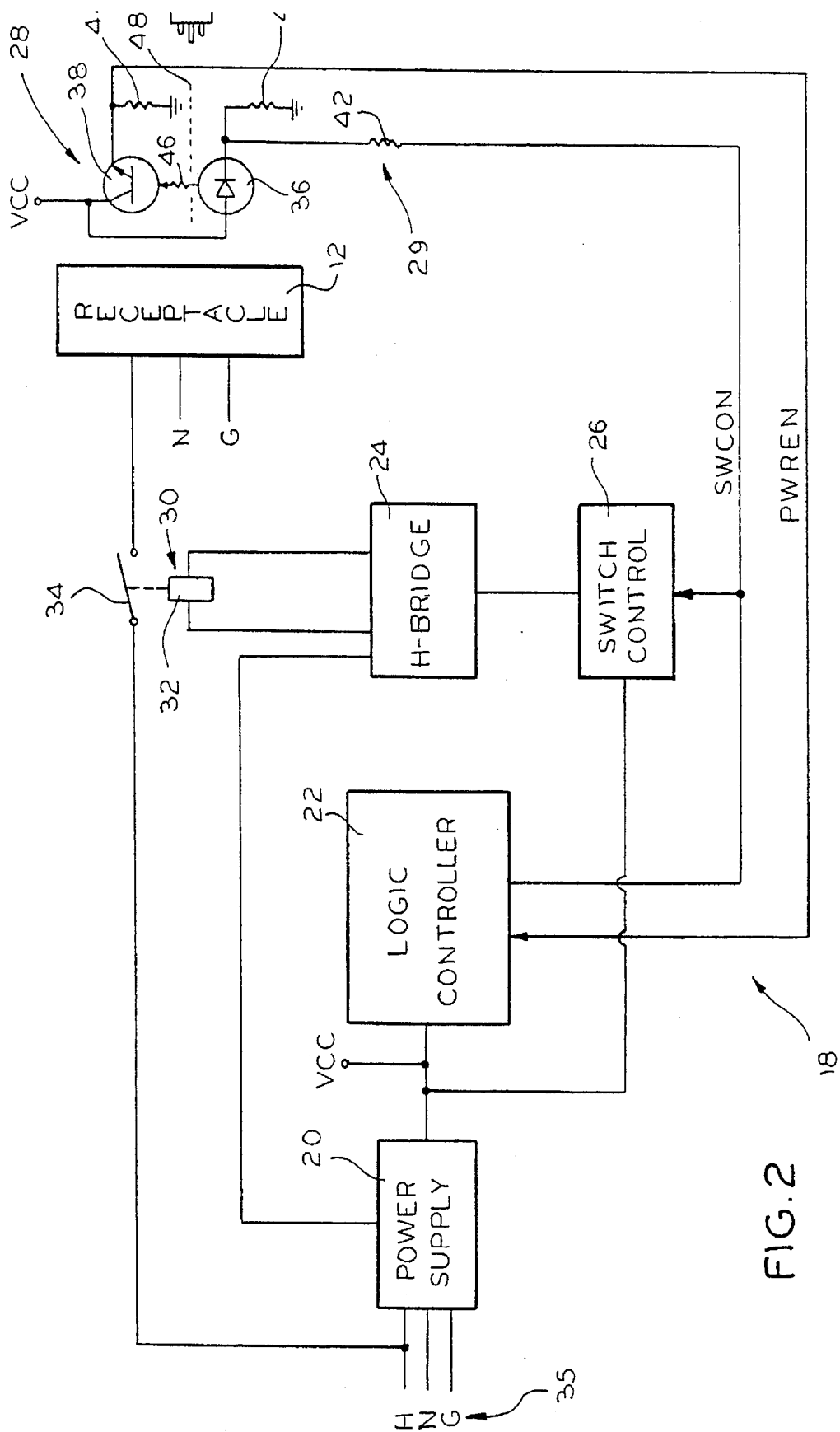
FIG. 2 is a block diagram illustrating a control circuit for the receptacle of FIG. 1.

FIG. 2 illustrates a control circuit 18 for the power receptacle 10 in block diagram form. The control circuit 18 includes a power supply circuit 20, a logic controller 22, an H-bridge switching circuit 24, a switch control circuit 26, a plug presence sensor 28 and a hysteresis circuit 29. The control circuit 18 is shown in association with the first outlet receptacle 12. A similar circuit would be used for the second outlet receptacle 14. Both such control circuits could use a common logic controller 22 and power supply 20.

A latching relay 30 controls the first outlet receptacle 12. The latching relay 30 has a relay coil 32 and an electrical contact 34 switched by the relay coil 32. The relay coil 32 is latched when connected to a positive polarity voltage source and unlatched when connected to a negative polarity voltage source. Such a latching relay 30 is permanently magnetized so that upon actuation by relatively high current of positive polarity, an included plunger is magnetically retained in an actuated position close the contact 34. When the reverse polarity power is connected to the relay coil 32, then the magnetic field is reduced so that a spring force returns the plunger to an unlatched position opening the contact 34. The latching relay 30 may be of any conventional construction.

The circuit does not require that the relay 30 be a latching relay. Instead, a conventional non-latching type relay could also be used, as will be obvious to those skilled in the art.

The power supply 20 is connected to a source of power 35 represented by input lines labeled "H" for hot, "N" for neutral and "G" for ground. The electrical contact 34 is connected between the hot terminal "H" and the hot terminal of the outlet receptacle 12 for selectively applying power to the same. The neutral and ground terminals are directly connected to the corresponding terminals of the outlet receptacle 12.

The power supply circuit 20 develops regulated DC power for operating the logic controller 22, the H-bridge circuit 24 and the switch control circuit 26. The logic controller 22 may be an integrated circuit including hardwired gates and latches to perform the described functions, or may be a conventional microcontroller programmed for developing logic signals as necessary for the particular application. The logic controller 22 communicates with the switch control circuit 26, the plug presence sensor circuit 28, and the hysteresis circuit 29 via a switch control line labeled "SWCON" and a power enable feedback line labeled "PRWEN".

The H-bridge switch circuit 24 comprises an H-bridge circuit of conventional construction which controls polarity of power applied to the relay coil 32. The relay coil 32 being of the remnant latching type, requires a well-defined pulse to operate. The pulsing of the H-bridge circuit 24 is controlled by the switch control circuit 26. Particularly, when the switch control line SWCON goes high, a first pulse is developed to control the H-bridge circuit to connect the relay coil 32 with positive polarity power. When the switch control line SWCON goes low, a second pulse is developed to control the H-bridge circuit 24 to provide negative polarity power to the relay coil 32. A current limit is included in the H-bridge circuit 24 to avoid overmagnetization during unlatching.

The plug presence sensor 28 comprises an LED 36 and a photo-transistor 38. The LED 36 is connected between a supply node, labeled VCC, and a resistor 40 to ground. The collector of the photo-transistor 38 is connected to supply, while its emitter is connected via a resistor 44 to ground. The junction between the resistor 44 and the emitter of the photo-transistor 38 is connected as feedback to the power enable line PWREN.

As an alternative to the photo-transistor 38, a photosensitive switching device, such as a photo-diode, and appropriate amplifying circuitry could be used, as would be apparent to those skilled in the art.

The hysteresis circuit 29 comprises an additional resistor 42 connected between the junction of the LED 36 and the resistor 40 to the switch control line SWCON.

In accordance with the invention, the LED 36 and the photo-transistor 38 are positioned in the housing 16 to be on opposite sides of a path of movement of one of the prongs of a plug P being inserted in the outlet receptacle 12. Particularly, the LED 36 acts as a light source directing light, as indicated by the arrow 46, to drive the photo-transistor 38. As the plug P is inserted in the outlet receptacle 12, as by moving it along a path of movement indicated by a dashed line 48, the prongs of the plug P break the beam of light to gradually decrease the amount of light sensed by the photo-transistor 38. Decreasing the amount of light turns the transistor 38 off. The status of the photo-transistor 38 is fed back to the logic controller 22 on the power enable line PWREN.

The plug presence sensor 28 could alternatively sense reflection of light. In such an application the presence of the plug blade would reflect light to be sensed by the photo-transistor. Thus, actuation would be by a presence of light, rather than an absence of light.

Figure 3:
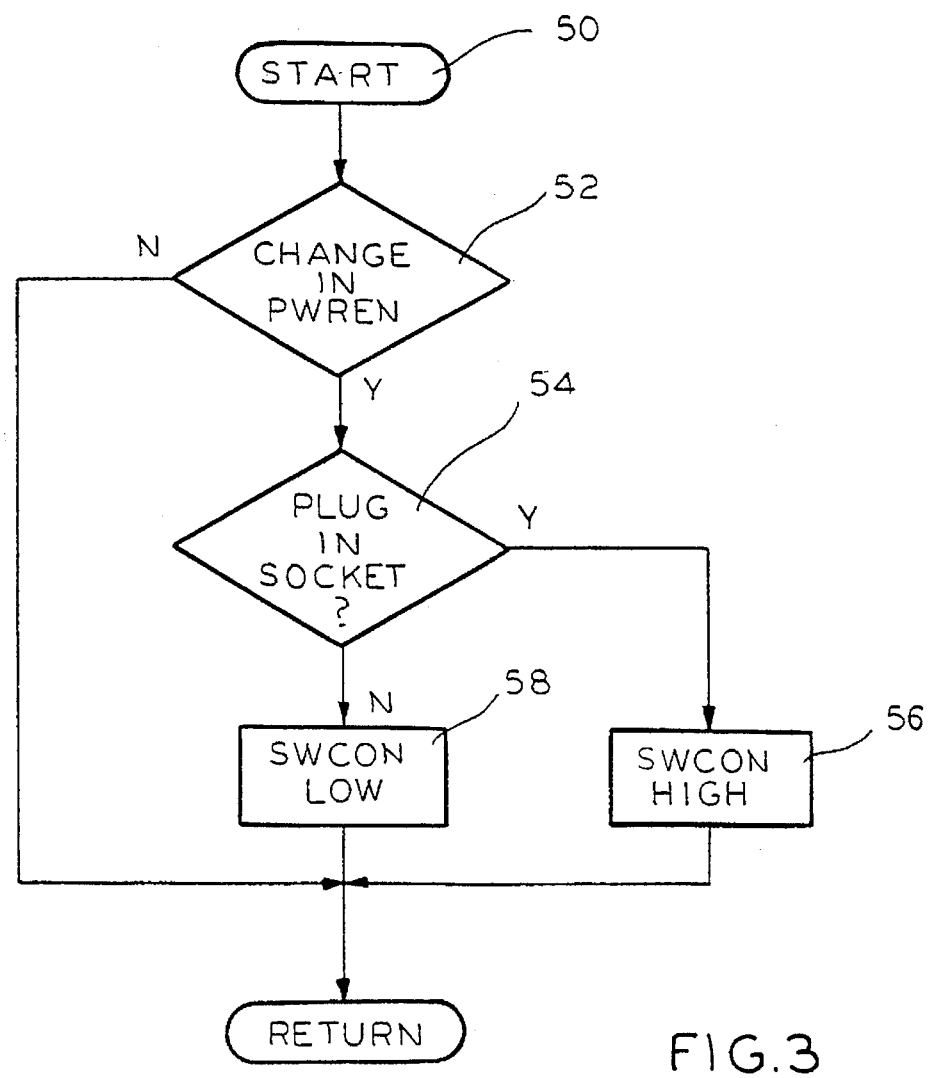
FIG. 3 is a flow diagram illustrating a program implemented in the logic controller of FIG. 2 for controlling the power receptacle.

With reference to FIG. 3, a flow diagram illustrates a program implemented in the logic controller 22 for controlling operation of the control circuit 18. The logic controller 22 may include a program for performing many different functions, such as providing remote control of the latching relay 30. The flow diagram illustrated in FIG. 3 is a portion of such program related specifically to the automatic control for the outlet receptacle 12 in response to presence of a plug.

The control starts at a node 50 and then a decision block 52 determines if there is a change in the power enable line PWREN to the logic controller. If not, then the routine ends. A change occurs either when the plug P is inserted or is removed from the outlet receptacle 12 causing a change in state of the photo-transistor 38. Particularly, the photo-transistor 38 is normally in an "on" state with no plug P present, as a result of light emitted sensed from the LED 36. When a plug P is inserted, the light is cut off to switch the photo-transistor 38 to the "off" state. When such a change in state is sensed on the PWREN line, then a decision block 54 determines if the change represents a plug being in the socket, i.e., the power enable line going low. If so, then the switch control line SWCON is set high at a block 56 and the routine ends. If not, then the switch control line SWCON is set low at a block 58 and the routine ends.

When the switch control line SWCON goes high, the switch control circuit 26 controls the H-bridge circuit 24 to generate a positive polarity pulse to the relay coil 32 to close the contact 34 to power the outlet receptacle. Conversely, when the switch control SWCON goes low, the transition is sensed by the switch control circuit 26, causing the H-bridge circuit 24 to generate a negative polarity pulse to the relay coil 32 to open the contact 34 and disable the outlet receptacle 12.

The switch control line SWCON is also connected via the hysteresis circuit 29 to the LED 36. Particularly, when the switch control line SWCON transitions from a low state to a high state, it decreases current through the LED 36, causing it to dim. When the switch control line SWCON transitions from a high state to a low state, it increases current through the LED 36, causing it to brighten. This control of illumination from the LED 36 enhances the effect on the photo-transistor 38 resulting from insertion or removal of a plug P. This provides hysteresis to prevent cycling of the latching relay 30, which would otherwise result if the plug P was slowly inserted or removed, which could modulate the amount of light received by the photo-transistor 38.

Particularly, as a plug P is inserted, the amount of light sensed by the photo-transistor 38 gradually decreases. At the point at which the light has decreased sufficiently to indicate presence of the plug, i.e., the power enable line PWREN goes low, the latching relay 30 is latched. This is done by turning on the SWCON output, which dims the LED 36. The dimming of the LED further decreases light sensed by the photo-transistor 38 so if the plug P is slightly removed, the removal would not cause a reverse change of state of the photo-transistor 38. Similarly, when a plug is removed, additional light is sensed by the photo-transistor 38 until a point is reached at which the plug P is considered to have been sufficiently removed to cause the photo-transistor 38 to turn on. This sets the power enable line PWREN high, causing the switch control line SWCON to go low to brighten the output from the LED 36. Brightening of the LED 38 increases light sensed by the photo-transistor 38 so that if the plug P is not completely removed quickly enough, then the photo-transistor 38 will not turn off again.

As described, the circuit uses an electronic plug presence sensor with the hysteresis circuit varying intensity of the light to provide the hysteresis function. Alternatively, an electrical contact could be used as a plug presence sensor, with hysteresis being provided by incorporating a time delay.

Thus, in accordance with the invention, an electrical hysteresis circuit is provided which prevents cycling of the latching relay 30 in an automatic power receptacle circuit.

We claim:

1. An automatically switched power receptacle comprising:

a outlet receptacle adapted to receive a plug;

a relay connected between said outlet receptacle and a source of power to selectively power said receptacle;

a plug presence sensor in proximity to said receptacle for sensing presence of a plug in said receptacle; and an automatic control circuit connected between said relay and said plug presence sensor for selectively energizing said relay to power said receptacle incident to said sensor sensing presence of a plug, said control circuit including a hysteresis circuit to prevent cycling of said relay.

2. The automatically switched power receptacle of claim 1 wherein said relay comprises a latching relay.

3. The automatically switched power receptacle of claim 1 wherein said plug presence sensor comprises a light source and a light sensor, said light source and light sensor being disposed on opposite sides of a path of movement of a plug being inserted in said receptacle.

4. The automatically switched power receptacle of claim 3 wherein said hysteresis circuit comprises means for dimming said light source when said relay is energized.

5. The automatically switched power receptacle of claim 3 wherein said light source comprises an LED and said light sensor comprises a photo-sensitive switching device.

6. An automatically switched power receptacle comprising:

a outlet receptacle adapted to receive a plug;

a relay connected between said outlet receptacle and a source of power to selectively power said receptacle;

a plug presence sensor in proximity to said receptacle for sensing presence of a plug in said receptacle, said plug presence sensor comprising a light source and a light sensor, said light source and light sensor being disposed on opposite sides of a path of movement of a plug being inserted in said receptacle; and an automatic control circuit connected between said relay and said plug presence sensor for selectively energizing said relay to power said receptacle incident to said sensor sensing presence of a plug.

7. The automatically switched power receptacle of claim 6 wherein said relay comprises a latching relay.

8. The automatically switched power receptacle of claim 6 wherein said control circuit includes a hysteresis circuit to prevent cycling of said relay.

9. The automatically switched power receptacle of claim 8 wherein said hysteresis circuit comprises means for dimming said light source when said relay is energized.

10. The automatically switched power receptacle of claim 8 wherein said light source comprises an LED and said light sensor comprises a photo-sensitive switching device.

11. An automatically switched power receptacle comprising:

- a outlet receptacle adapted to receive a plug;
- a relay connected between said outlet receptacle and a source of power to selectively power said receptacle;
- a plug presence sensor in proximity to said receptacle for sensing presence of a plug in said receptacle, said plug presence sensor comprising a light source and a light sensor, said light source and light sensor being disposed on opposite sides of a path of movement of a plug being inserted in said receptacle and said light sensor assuming a first or second state incident to sensed light being above or below a select level; and
- an automatic control circuit connected between said relay and said plug presence sensor for selectively energizing said relay to power said receptacle incident to said light sensor being in said second state and including means for determining if said relay is energized and controlling said light source to dim said light source if said relay is energized.

12. The automatically switched power receptacle of claim 11 wherein said relay comprises a latching relay.

13. The automatically switched power receptacle of claim 11 wherein said light source comprises an LED and said light sensor comprises a photo-sensitive switching device.

14. The automatically switched power receptacle of claim 11 wherein said determining means dims said light source incident to said light sensor being in said second state.

* * * * *